United States Patent
Yabe (10) Patent No.: US 12,241,527 B2
(45) Date of Patent: Mar. 4, 2025

(54) MULTI-ROW BALL SCREW

(71) Applicant: NSK LTD., Tokyo (JP)

(72) Inventor: Takayuki Yabe, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/285,049

(22) PCT Filed: Mar. 23, 2022

(86) PCT No.: PCT/JP2022/013763
§ 371 (c)(1),
(2) Date: Sep. 29, 2023

(87) PCT Pub. No.: WO2022/210223
PCT Pub. Date: Oct. 6, 2022

(65) Prior Publication Data
US 2024/0191789 A1 Jun. 13, 2024

(30) Foreign Application Priority Data
Mar. 31, 2021 (JP) .................. 2021-062357

(51) Int. Cl.
*F16H 25/22* (2006.01)
*F16H 25/24* (2006.01)

(52) U.S. Cl.
CPC ......... *F16H 25/24* (2013.01); *F16H 25/2204* (2013.01)

(58) Field of Classification Search
CPC ................. F16H 25/24; F16H 25/2204; F16H 2025/2242; F16H 25/22
See application file for complete search history.

(56) References Cited

U.S. PATENT DOCUMENTS

2011/0239799 A1 10/2011 Singh et al.

FOREIGN PATENT DOCUMENTS

| CN | 100398872 C | 7/2008 |
|---|---|---|
| JP | 49-93767 A | 9/1974 |
| JP | 56-120851 A | 9/1981 |

(Continued)

OTHER PUBLICATIONS

Written Opinion (PCT/ISA/237) issued Apr. 26, 2022 from the International Searching Authority in International Application No. PCT/JP2022/013763.

(Continued)

*Primary Examiner* — Bobby Rushing, Jr.
(74) *Attorney, Agent, or Firm* — Sughrue Mion, PLLC (57) ABSTRACT

A multi-row ball screw includes a nut having a plurality of spiral grooves on an inner peripheral surface thereof, a screw shaft having a plurality of spiral grooves on an outer peripheral surface thereof, and a plurality of balls disposed so as to be rollable on rolling paths constituted by the plurality of spiral grooves of the nut and the plurality of spiral grooves of the screw shaft. The spiral groove of the nut includes a U-shaped first spiral groove having left and right flanks that are respectively able to come into contact with two-row balls and separated from each other in an axial direction, and two second spiral grooves continuous with each row of the first spiral groove and each having left and right flanks that are able to come into two-point contact with the ball.

3 Claims, 6 Drawing Sheets

(56) References Cited

FOREIGN PATENT DOCUMENTS

| JP | 56-147954 A | | 11/1981 |
|----|-------------|---|---------|
| JP | 56-147955 A | | 11/1981 |
| JP | S61182451 U | * | 11/1986 |

OTHER PUBLICATIONS

International Search Report (PCT/ISA/210) issued Apr. 26, 2022 from the International Searching Authority in International Application No. PCT/JP2022/013763.

* cited by examiner

FIG. 7

MULTI-ROW BALL SCREW

CROSS-REFERENCE TO RELATED APPLICATIONS

This is a National Phase Entry of PCT International Application No. PCT/JP2022/013763 filed on Mar. 23, 2022, which claims priority to Japanese Patent Application No. 2021-062357 filed on Mar. 31, 2021, the contents of all which are incorporated herein by reference in their entirety.

TECHNICAL FIELD

The present invention relates to a multi-row ball screw, and more particularly, to a multi-row ball screw used in an electric injection molding machine, a press machine, or the like as a mechanical element that converts a rotational motion into a linear motion.

BACKGROUND ART

A ball screw generally includes a screw shaft formed with a spiral groove formed on an outer peripheral surface thereof, a cylindrical nut formed with a spiral groove formed on an inner peripheral surface thereof and mounted on an outer periphery of the screw shaft, and a plurality of balls incorporated between the spiral grooves of the screw shaft and the nut, and converts a rotational motion of one of the screw shaft and the nut to a linear motion of the other one of the screw shaft and the nut. For example, Patent Literature 1 discloses a low-friction and high-rigidity ball screw having a structure in which spiral grooves of a screw shaft and a nut are each formed in a wide U-shape (cross-sectional shape) and two-row balls are disposed in the spiral grooves.

CITATION LIST

Patent Literature

Patent Literature 1: JPS56-147954A

SUMMARY OF INVENTION

Technical Problem

However, when accurately processing the U-shaped spiral groove of the nut as described in Patent Literature 1, a high degree of measurement technique is required. In a case of a ball groove having a Gothic shape, which is a general ball groove, a ball having the same diameter as a diameter of a ball to be used is fixed to a measurement terminal, an oblique diameter dimension is measured, and the ball can be processed to a target dimension. However, in the case of the U-shaped spiral groove, since there is no flank on one side, it is difficult to stably fix the ball of the measurement terminal to the spiral groove, and accurate dimension measurement is difficult.

The present invention has been made in view of the problems described above, and an object of the present invention is to provide a multi-row ball screw having a nut with high dimensional accuracy in a U-shaped spiral groove accommodating two-row balls.

Solution to Problem

The above object of the present invention is achieved by the following configuration.

A multi-row ball screw including:
a nut having a plurality of spiral grooves on an inner peripheral surface thereof;
a screw shaft having a plurality of spiral grooves on an outer peripheral surface thereof; and
a plurality of balls disposed so as to be rollable on rolling paths constituted by the plurality of spiral grooves of the nut and the plurality of spiral grooves of the screw shaft,
wherein each of the plurality of spiral grooves of the nut includes a U-shaped first spiral groove having left and right flanks that are respectively able to come into contact with two-row balls and separated from each other in an axial direction, and two second spiral grooves continuous with each row of the first spiral groove and each having left and right flanks that are able to come into two-point contact with the ball.

Advantageous Effects of Invention

According to the multi-row ball screw of the present invention, it is possible to accurately measure an oblique diameter dimension by the second spiral groove, and as a result, it is possible to grind the first spiral groove based on the accurate oblique diameter dimension, and it is possible to provide the multi-row ball screw having the nut in which a U-shaped first spiral groove has high dimensional accuracy.

DESCRIPTION OF EMBODIMENTS

Hereinafter, a multi-row ball screw according to an embodiment of the present invention will be described in detail with reference to the drawings.

Figure 1:
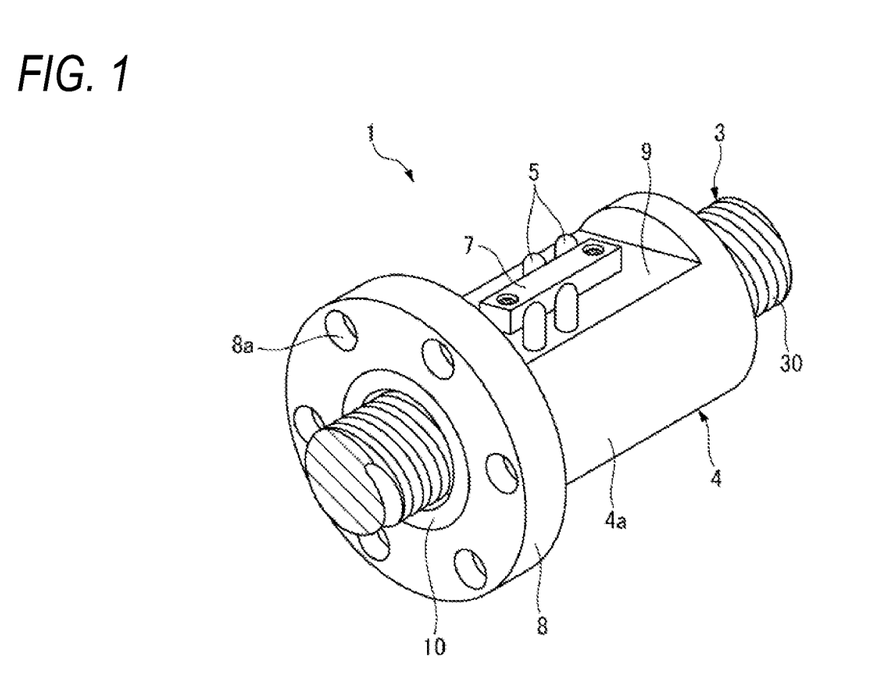
FIG. 1 is an external perspective view of a multi-row ball screw according to an embodiment of the present invention.
Figure 2:
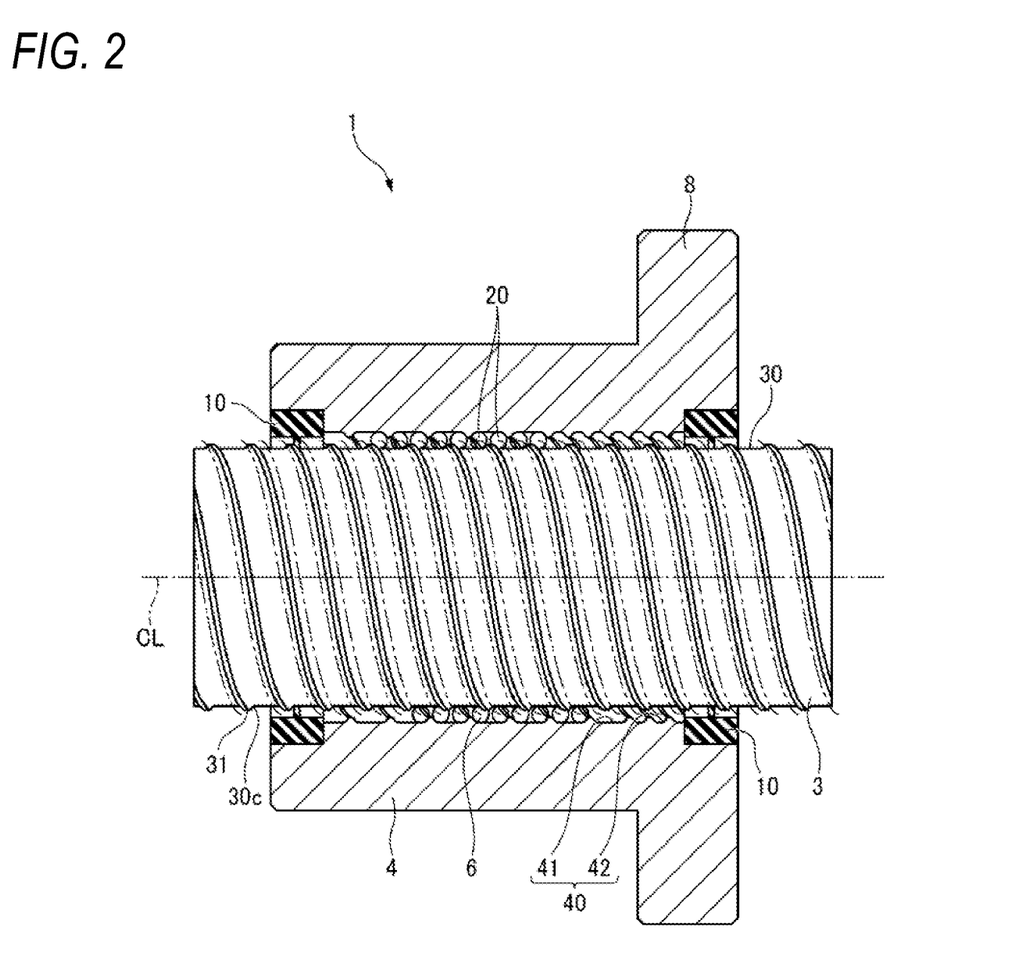
FIG. 2 is a cross-sectional view of the multi-row ball screw of FIG. 1.

As shown in FIGS. 1 and 2, a multi-row ball screw 1 according to the present embodiment includes a nut 4 having a plurality of spiral grooves 40 on an inner peripheral surface thereof, a screw shaft 3 having a plurality of spiral grooves 30 on an outer peripheral surface thereof, and a plurality of steel balls 6 disposed so as to be rollable on a rolling path 20 constituted by the spiral grooves 40, 30.

For example, seal rings 10 are fitted to inner peripheries of both end sides of the nut 4 to prevent leakage of lubricating oil between the nut 4 and the screw shaft 3. The nut 4 is made of, for example, tough steel such as chromium molybdenum steel.

The nut 4 includes a circular plate-shaped flange 8 on one end side (a left side in FIG. 1) of a cylindrical nut body 4a, and the flange 8 is provided with bolt through holes 8a as necessary. Accordingly, in the multi-row ball screw 1, for example, the screw shaft 3 is connected to a driving unit (a shaft of an electric motor or the like) (not shown) and is rotationally driven in both forward and reverse rotational directions, while the nut 4 is used by fastening a driven member (a driven member such as an electric injection molding machine, a press machine, or a conveying machine) (not shown) to the flange 8 via the bolt through hole 8a.

On an outer peripheral surface of the nut body 4a, a plurality of flat surfaces 9 (only one is shown in FIG. 1) each having a rectangular shape in a plan view are formed in a peripheral direction, and a pair of return tubes 5 are fastened to each of the flat surfaces 9 by a tube clamp 7. Each of the return tubes 5 is formed by bending a steel pipe into a substantially U-shape, and both end portions of the tubes penetrate four through holes (through holes connected to a first spiral groove 41) formed in the flat surface 9 and are connected to the rolling path 20. Accordingly, two ball circulation paths (two circuits) are formed in which a large number of balls 6 move and circulate in the rolling path 20 via the respective return tubes 5.

Figure 3:
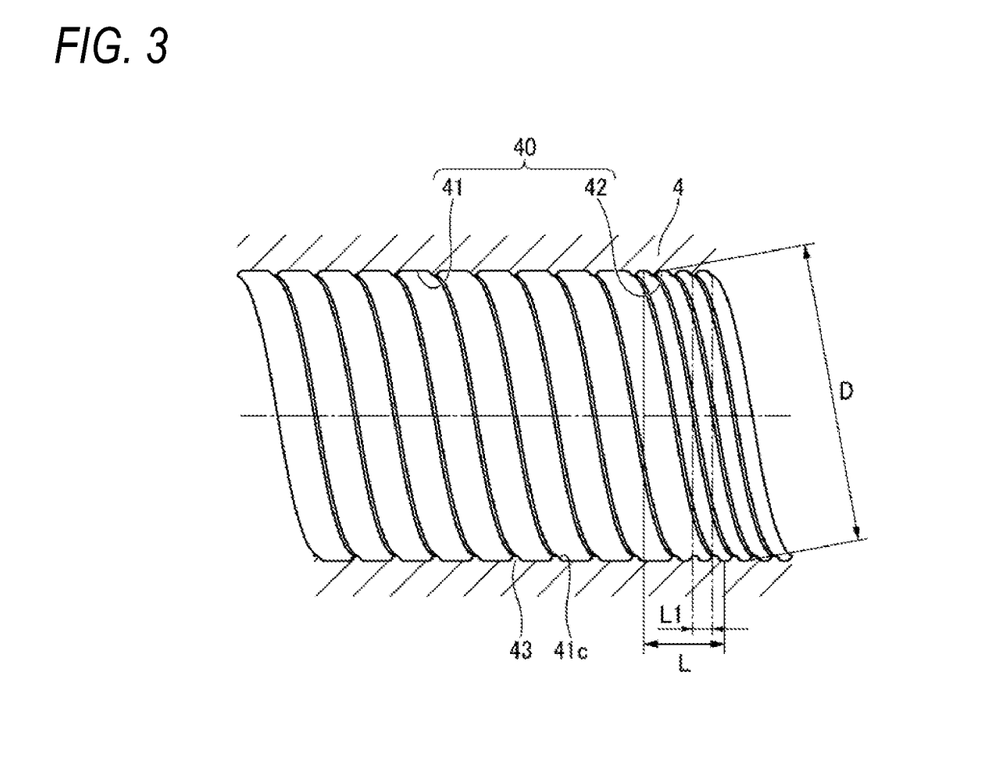
FIG. 3 is a sectional view of main parts showing a spiral groove of a nut.
Figure 4:
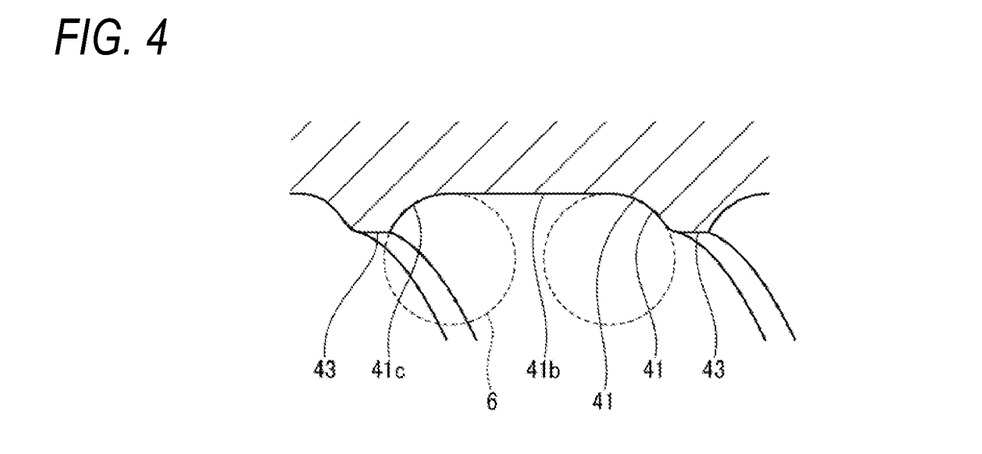
FIG. 4 is an enlarged cross-sectional view of a first spiral groove shown in FIG. 3.
Figure 5:
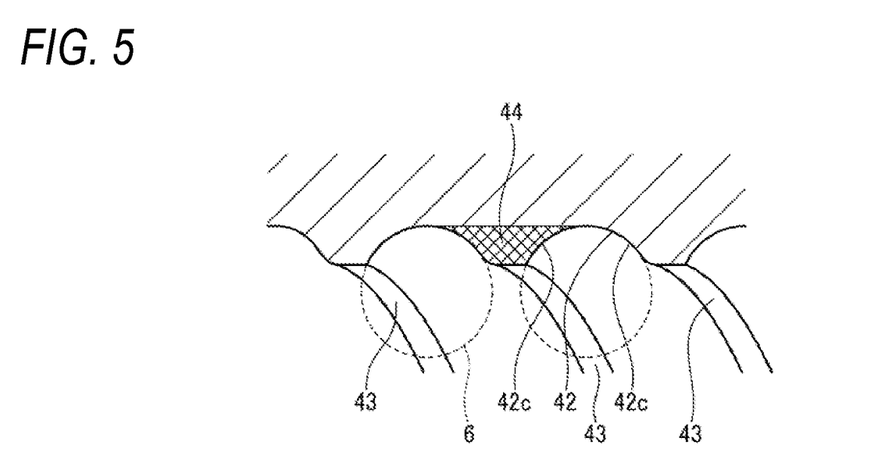
FIG. 5 is an enlarged cross-sectional view of a second spiral groove shown in FIG. 3.

Referring also to FIGS. 3 to 5, the spiral groove 40 of the nut 4 has a U-shaped first spiral groove 41 having left and right flanks 41c that are respectively able to come into contact with the two-row balls 6 and separated from each other in an axial direction, and two second spiral grooves 42 continuous with each row of the first spiral groove 41 and each having left and right flanks 42c that are able to come into two-point contact with the ball 6. The terms "left" and "right" mean both sides along a central axis CL in FIG. 2.

That is, the first spiral groove 41 has a cylindrical groove bottom 41b between the left and right flanks 41c between the adjacent ridge portions 43, and is formed in a U shape that is wide in a left-right direction. Accordingly, in the first spiral groove 41, the left flank 41c and the right flank 41c respectively support the two rows of balls 6 of the two circuits.

On the other hand, the second spiral groove 42 has left and right flanks 42c having substantially the same shape as that of the left and right flanks 41c of the first spiral groove, and the left and right flanks 42c are formed in a Gothic arc shape capable of being in two-point contact with the ball 6.

In the present embodiment, since the second spiral groove 42 is continuous with the first spiral groove 41 on an axially outer side of a ball scoop-up portion of a ball circulation path, the actual ball 6 does not circulate through the left and right flanks 42c, but as will be described later, the same spherical fixture as the ball 6 or a measurement terminal having a spherical portion of the same size as the ball 6 is brought into contact with the left and right flanks 42c at two points.

The first spiral groove 41 has a shape obtained by cutting off an intermediate ridge portion 44 (shaded portion in FIG. 5) formed between the second spiral grooves 42, and the first spiral groove 41 is formed by cutting off the intermediate ridge portion 44 after or at the same time as the formation of the second spiral groove 42.

The spiral groove 30 of the screw shaft 3 is also configured as a wide U-shaped groove in which two balls 6 can be accommodated side by side in a direction of the central axis CL, and has substantially the same cross-sectional shape as the first spiral groove 41 of the nut 4. Accordingly, the balls 6 in the spiral groove 30 are supported by flanks 30c formed on both left and right sides. As the constituent material of the screw shaft 3, for example, tough steel such as chromium molybdenum steel can be used.

The spiral groove 30 of the screw shaft 3 and the first spiral groove 41 of the nut 4 constitute the rolling path 20 such that the ridge portion 31 of the screw shaft 3 faces an axially intermediate portion of the first spiral groove 41 and the ridge portion 43 of the nut 4 faces an axially intermediate portion of the spiral groove 30. Accordingly, the balls 6 are held between the flank 30c of the screw shaft 3 and the flank 41c of the nut 4. Accordingly, the plurality of balls 6 incorporated between the spiral groove 30 and the first spiral groove 41 roll in the rolling path 20 as the screw shaft 3 rotates relative to the nut 4, and the plurality of balls 6 roll in the rolling path 20 as the screw shaft 3 rotates, thereby smoothly moving the nut 4 in the axial direction.

A plurality of (four in the present embodiment) two-row rolling paths 20 are formed, and the multi-row ball screw 1 having the multi-row rolling paths 20 of the present embodiment (even rows which are at least two rows) is thereby configured.

Here, when forming the spiral groove 40 in the nut 4, the first spiral groove 41 and the second spiral groove 42 are cut on the inner peripheral surface of the nut body 4a by a lathe, and then heat treatment (quenching) is performed using a carburizing heat treatment device or a high-frequency heat treatment device.

Thereafter, processing for forming the first spiral groove 41 to a predetermined dimension is performed. The processing is performed by turning, but grinding may be performed after turning. At this time, dimension measurement for determining a processing amount is performed, a cutting amount and a grinding amount are calculated from a dimension measurement result, and turning and grinding are performed.

In the dimension measurement, as shown in FIG. 3, an oblique diameter dimension D of the second spiral groove 42 (a dimension between grooves facing each other at a phase of 180° in a state where the groove advances by 0.5 lead) is measured using the measurement terminal. Therefore, at least one of the second spiral grooves 42 remains 0.5 leads (indicated by a dimension L in FIG. 3) or more.

In addition, the oblique diameter dimension D of a portion of the second spiral groove 42 is the same dimension as an oblique diameter dimension of the first spiral groove 41. That is, since the first spiral groove 41 has a shape obtained by cutting off the intermediate ridge portion 44 between the two second spiral grooves 42, the oblique diameter dimension D between the grooves of the second spiral groove 42 represents the oblique diameter dimension of the first spiral groove 41.

Further, at the time of measurement, the ball-shaped fixture or the measurement terminal is stably held by the left and right flanks 42c of the second spiral groove 42, so that the oblique diameter dimension D can be accurately measured.

Since the two spiral grooves are disposed at a phase of 180°, the other second spiral groove 42 is formed at an opposite side to the one second spiral groove 42 by 180° at the two same positions in the axial direction. Therefore, it is sufficient that there is a groove short enough to set a measurement instrument and the measurement terminal, and a groove length L1 of the second spiral groove 42 is equal to or larger than a diameter of the ball.

Figure 6:
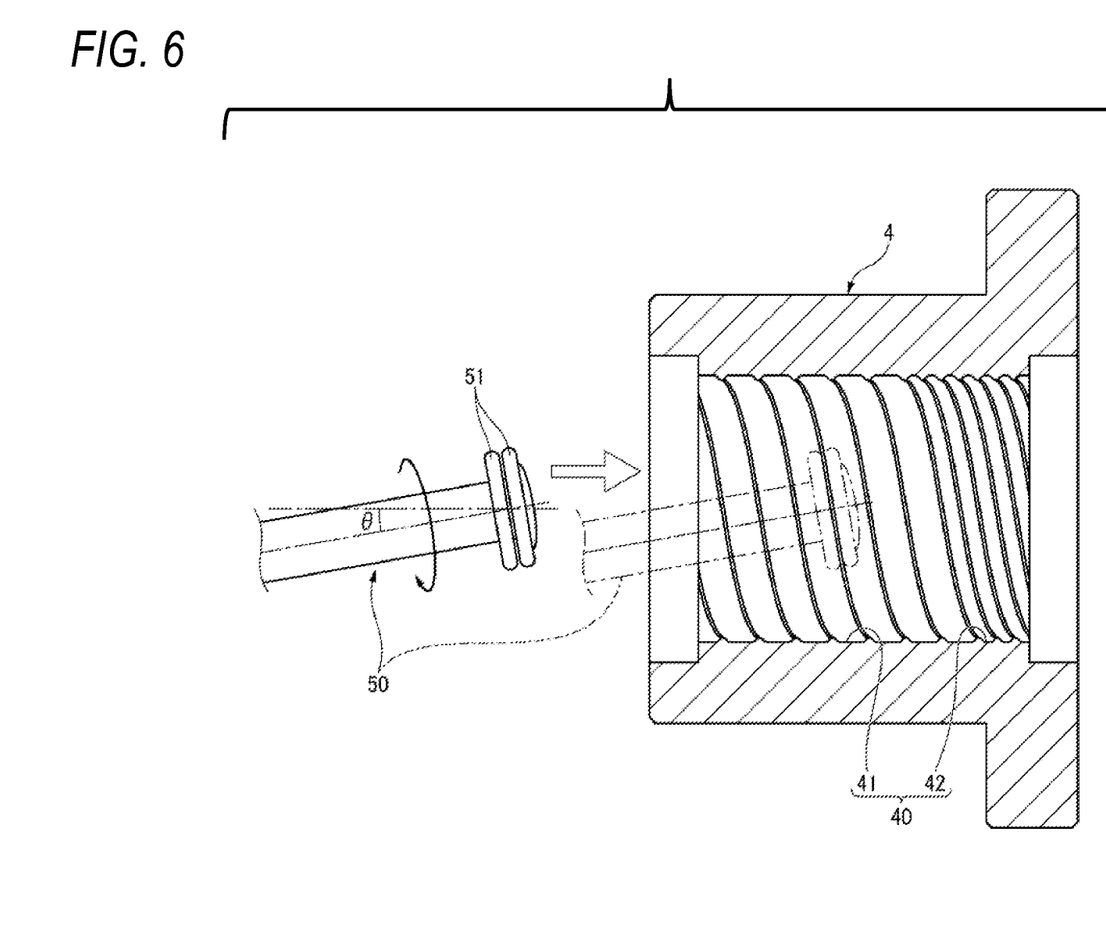
FIG. 6 is a schematic sectional view showing a state of grinding the nut.
Figure 7:
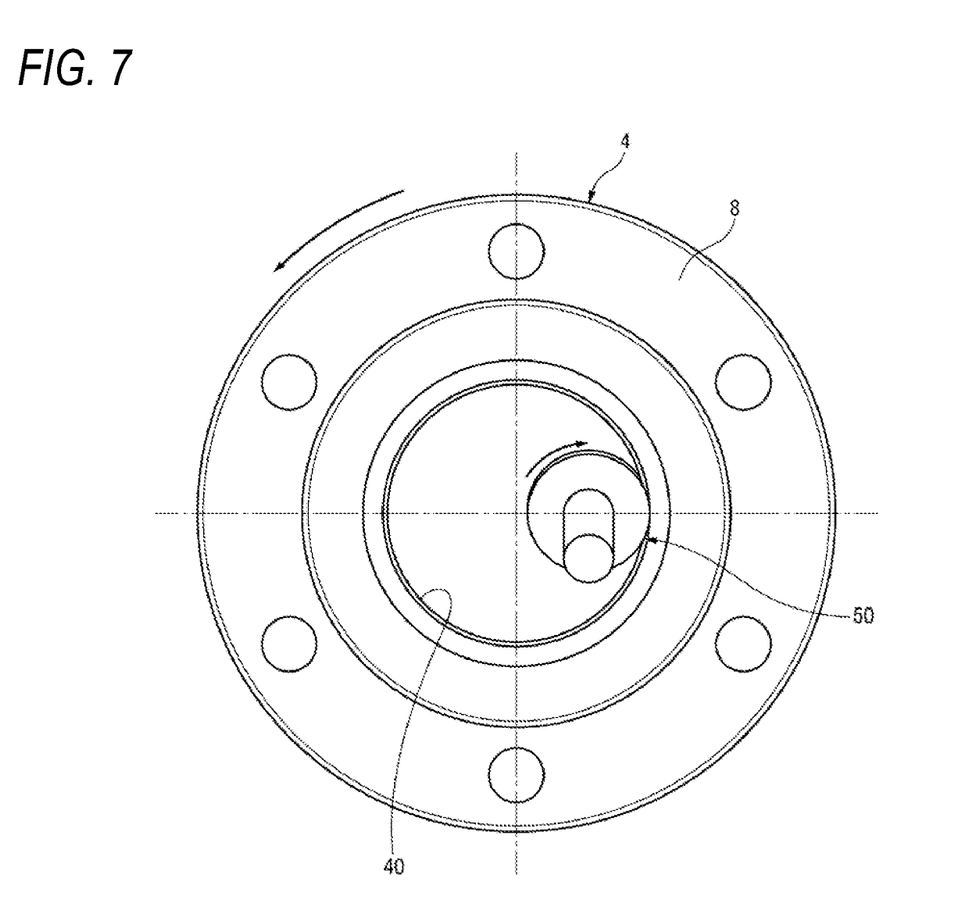
FIG. 7 is a schematic front view showing a state of grinding the nut.

As a result of the dimension measurement, the grinding amount necessary for a finished dimension is determined, and the processing is performed as shown in FIGS. 6 and 7. A quill 50 used for grinding has a pair of grinding stones 51 matching the shape of the flank 41c of the first spiral groove 41, and is set to be inclined along a lead angle θ of the first spiral groove 41 with respect to the central axis CL, and by rotating the grinding stone 51 at a high speed, the flanks 41c of the adjacent first spiral grooves 41 and the flanks 42c of the adjacent second spiral grooves 42, which are on both left and right sides with respect to the ridge portion 43, are machined.

By performing processing while measuring the oblique diameter dimension D of the second spiral groove 42 in this manner, it is possible to form the nut 4 having the first spiral groove 41 with high dimensional accuracy.

The present invention is not limited to the embodiment described above, and modifications, improvements, and the like can be appropriately made.

For example, in the embodiment described above, the second spiral groove 42 for measuring the oblique diameter dimension may be formed in the screw shaft 3. Accordingly, by accurately machining the oblique diameter dimension of the screw shaft 3, it is possible to form the screw shaft 3 having the spiral groove 30 with high dimensional accuracy.

As described above, the following matters are disclosed in the present specification.

(1) A multi-row ball screw including:
  a nut having a plurality of spiral grooves on an inner peripheral surface thereof;
  a screw shaft having a plurality of spiral grooves on an outer peripheral surface thereof; and
  a plurality of balls disposed so as to be rollable on rolling paths constituted by the plurality of spiral grooves of the nut and the plurality of spiral grooves of the screw shaft,
  wherein each of the plurality of spiral grooves of the nut includes a U-shaped first spiral groove having left and right flanks that are respectively able to come into contact with two-row balls and separated from each other in an axial direction, and two second spiral grooves continuous with each row of the first spiral groove and each having left and right flanks that are able to come into two-point contact with the ball.

According to this configuration, it is possible to accurately measure an oblique diameter dimension by the second spiral groove, and as a result, it is possible to process the first spiral groove based on the accurate oblique diameter dimension, and it is possible to provide the multi-row ball screw having the nut in which a U-shaped spiral groove has high dimensional accuracy.

(2) The multi-row ball screw according to (1),
  wherein second spiral groove is formed by 0.5 leads or more.

According to this configuration, in the second spiral groove, the oblique diameter dimension of the second spiral groove can be accurately measured.

(3) The multi-row ball screw according to (1) or (2),
  wherein a groove length of the second spiral groove is equal to or larger than a diameter of the ball.

According to this configuration, a measurement terminal can be set, and the oblique diameter dimension can be measured in the second spiral groove.

The present application is based on a Japanese patent application (Japanese Patent Application No. 2021-062357) filed on Mar. 31, 2021, and the contents thereof are incorporated herein by reference.

The invention claimed is:

1. A multi-row ball screw comprising:
  a nut having a plurality of spiral grooves on an inner peripheral surface thereof;
  a screw shaft having a plurality of spiral grooves on an outer peripheral surface thereof; and
  a plurality of balls disposed so as to be rollable on rolling paths constituted by the plurality of spiral grooves of the nut and the plurality of spiral grooves of the screw shaft,
  wherein each of the plurality of spiral grooves of the nut includes a U-shaped first spiral groove portion having left and right flanks that are respectively configured to come into contact with two-row balls and separated from each other in an axial direction, and two second spiral grooves portion continuous with each row of the first spiral groove portion and each having left and right flanks that are configured to come into two-point contact with one ball of the plurality of balls.

2. The multi-row ball screw according to claim 1,
  wherein at least one of the second spiral grooves of the two second spiral grooves portion is formed by 0.5 leads or more.

3. The multi-row ball screw according to claim 1,
  wherein a groove length of the second spiral grooves portion is equal to or larger than a diameter of the ball.

\* \* \* \* \*